(12) United States Patent
Kidokoro et al.

(10) Patent No.: US 6,832,337 B2
(45) Date of Patent: Dec. 14, 2004

(54) METHOD AND APPARATUS FOR MONITORING MICROCOMPUTER IN ELECTRONIC CONTROL UNIT

(75) Inventors: Hiroyasu Kidokoro, Kariya (JP); Hideki Kabune, Chiryu (JP); Hajime Kumabe, Kariya (JP)

(73) Assignee: Denso Corporation, Kariya (JP)

( * ) Notice: Subject to any disclaimer, the term of this patent is extended or adjusted under 35 U.S.C. 154(b) by 587 days.

(21) Appl. No.: 09/824,712

(22) Filed: Apr. 4, 2001

(65) Prior Publication Data

US 2002/0023242 A1 Feb. 21, 2002

(30) Foreign Application Priority Data

Apr. 28, 2000 (JP) ........................................ 2000-130803

(51) Int. Cl.[7] .............................................. G06F 11/00
(52) U.S. Cl. ...................................................... 714/30
(58) Field of Search ............................. 714/10, 21, 30, 714/49, 50, 51, 55; 701/76, 92

(56) References Cited

U.S. PATENT DOCUMENTS

| | | | |
|---|---|---|---|
| 4,789,938 A | * 12/1988 | Maehata et al. | ............... 701/76 |
| 4,809,280 A | * 2/1989 | Shonaka | ...................... 714/55 |
| 5,335,979 A | * 8/1994 | Naitou et al. | ................ 303/191 |
| 5,493,495 A | * 2/1996 | Naito et al. | .................... 701/76 |
| 5,506,776 A | * 4/1996 | Fushimi et al. | ............... 701/41 |
| 5,735,583 A | * 4/1998 | Katayama et al. | ..... 303/122.05 |
| 5,850,514 A | * 12/1998 | Gonda et al. | .................. 714/55 |
| 5,978,939 A | * 11/1999 | Mizoguchi et al. | ............ 714/55 |
| 6,012,156 A | 1/2000 | Zydek et al. | |
| 6,112,320 A | * 8/2000 | Dien | ............................ 714/51 |
| 6,385,743 B1 | * 5/2002 | Huckfeldt et al. | ............. 714/51 |
| 2001/0044688 A1 | * 11/2001 | Okita et al. | .................... 701/92 |
| 2002/0083375 A1 | * 6/2002 | Indo | ............................ 714/51 |
| 2002/0124212 A1 | * 9/2002 | Nitschke et al. | .............. 714/55 |

FOREIGN PATENT DOCUMENTS

| | | | |
|---|---|---|---|
| DE | 44 46 314 A1 | * 6/1996 | ......... G05B/19/048 |
| DE | 198 45 220 | 4/2000 | |
| EP | 0 322 141 | 12/1988 | |
| EP | 0 575 854 | 6/1993 | |
| JP | 61-023202 A | 1/1986 | |
| JP | 03-259716 A | 11/1991 | |
| JP | 06-035531 A | 2/1994 | |
| JP | 11-028642 A | 2/1999 | |
| JP | 2000-029747 A | 1/2000 | |

OTHER PUBLICATIONS

Howstuff works.com "How power brakes work", date unknown.*
Howstuffworks.com "how anti–lock brakes work" date unknown.*

* cited by examiner

Primary Examiner—Robert Beausoliel
Assistant Examiner—Bryce P. Bonzo
(74) Attorney, Agent, or Firm—Posz & Bethards, PLC

(57) ABSTRACT

In an electronic control unit for an anti-lock brake control system, a microcomputer communicates data to a peripheral IC. The peripheral IC monitors a fault of the microcomputer based on data received from the microcomputer. The monitoring operation may be executed by measuring an interval of calculation, calculation result and sequence of data transmitted from the microcomputer.

21 Claims, 9 Drawing Sheets

METHOD AND APPARATUS FOR MONITORING MICROCOMPUTER IN ELECTRONIC CONTROL UNIT

CROSS REFERENCE TO RELATED APPLICATION

This application is based on and incorporates herein by reference Japanese Patent Application No. 2000-130803 filed Apr. 28, 2000.

BACKGROUND OF THE INVENTION

The present invention relates to a method and apparatus for monitoring a microcomputer provided in an electronic control unit.

A microcomputer provided in an electronic control unit (ECU) for vehicles is generally monitored to detect whether the microcomputer is functioning normally or not, whether an input to the microcomputer is normal or not, or whether arithmetic operation in the microcomputer is carried out accurately or not.

The monitoring is conducted, for example, by executing the watch-dog (WD) monitoring to detect whether the arithmetic calculation period in a monitoring integrated circuit (IC) is in the correct period or not by inputting the arithmetic calculation period to the monitoring IC from the microcomputer. It may also be conducted by comparing the arithmetic calculation result of each microcomputer by using additional microcomputer of the same structure as the microcomputer to conduct the arithmetic calculation operation.

However, the WD monitoring results in that the monitoring capability is insufficient because contents of monitoring are limited. The mutual monitoring using a couple of microcomputers results in that a fault cannot be detected if there is an error in data inputted to a couple of microcomputers and that monitoring cost becomes high because a couple of microcomputers are used.

SUMMARY OF THE INVENTION

It is therefore an object of the present invention to provide a method of monitoring a microcomputer without requiring a couple of microcomputers.

According to the present invention, a microcomputer and a peripheral IC are connected to communicate data with each other. The peripheral IC monitors a fault of the microcomputer based on the data received from the microcomputer. The monitoring operation may be executed by measuring an interval of calculation, calculation result and sequence of data transmitted from the microcomputer. The microcomputer monitors a fault of the peripheral IC based on the data received from the peripheral IC.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to embodiments, which are directed to an electronic control unit (ECU) for vehicles.

(First Embodiment)

Figure 1:
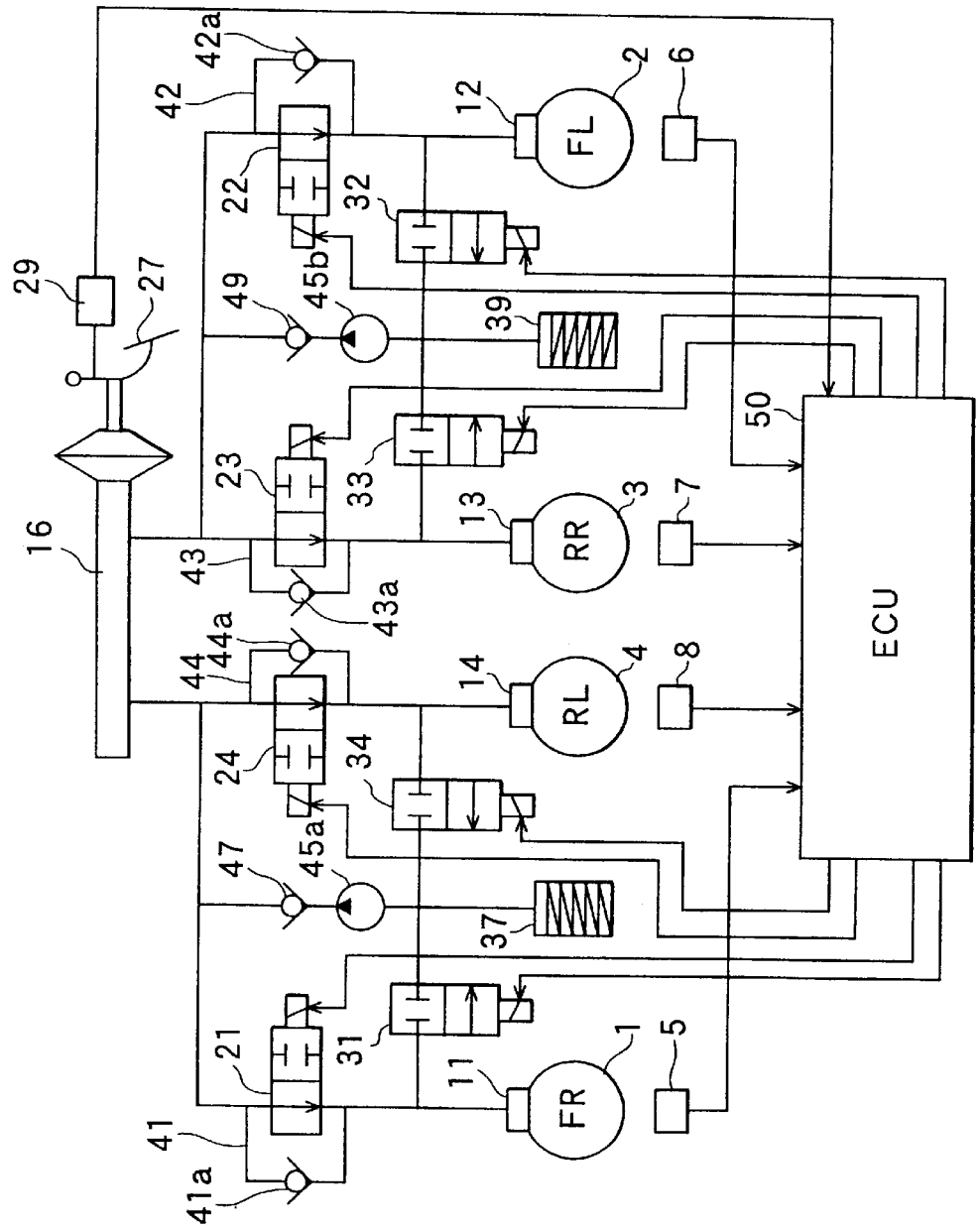
FIG. 1 is a schematic diagram illustrating an ABS control system controlled by an ECU for ABS control according to a first embodiment of the present invention.

Referring first to FIG. 1 showing an anti-lock braking control system (ABS), a front-right (FR) wheel 1, a front-left (FL) wheel 2, a rear-right (RR) wheel 4 and a rear-left (RL) wheel 4 are provided with an electromagnetic pickup type, a magneto-resistive effect device (MRE) type or a Hall device type wheel speed sensors 5 to 8, respectively. These wheel speed sensors 5 to 8 generate respective pulse signals depending on rotation of the wheels 1 to 4.

Moreover, the wheels 1 to 4 are respectively provided with wheel cylinders 11 to 14. When a master cylinder 16 generates a brake fluid pressure depending on the driver's stepping-on amount of a brake pedal 27, this brake fluid pressure is transferred to the wheel cylinders 11 to 14 via dual-position valves (pressure increase control valves) 21 to 24 and through respective fluid pressure piping. The stepping-on condition of the brake pedal 27 is detected by a stop switch 29.

Moreover, the wheel cylinders 11, 14 are connected with a reservoir 37 via dual-position valves (pressure decrease control valves) 31, 34, respectively. The wheel cylinders 12, 13 are connected with a reservoir 39 via dual-position valves (pressure decrease control valves) 32, 33, respectively.

The dual-position valves 21 to 24 and 31 to 34 are each comprised of a solenoid drive type dual-position valve including a communication position and a shut-off position. These communication position and shut-off position can be switched by supplying electric power to the solenoid.

On the other hand, the upstream and downstream of the dual-position valves 21 to 24 are connected with bypass piping 41 to 44, respectively. These bypass piping 41 to 44 are provided with non-return valves 41a to 44a, respectively. Only the fluid pressure toward the master cylinder 16 from the wheel cylinders 11 to 14 flows through the bypass piping 41 to 44.

The reservoirs 37, 39 are connected with a fluid pressure piping via pumps 45a, 45b driven by motors not illustrated and non-return valves 47, 49, respectively. Only the fluid pressure toward the master cylinder 16 from the reservoirs 37, 39 is allowed to flow.

Detection signals of the wheel speed sensors 5 to 8 and stop switch 29 are inputted to an ECU 50 for ABS control. The ABS control ECU 50 generates, based on the above detection signals, control signals for the dual-position valves 21 to 24 and 31 to 34 and motor control signals to drive the pumps 45a, 45b. On the basis of these control signals, the dual-position valves 21 to 24 and 31 to 34 and motor are controlled for the purpose of ABS control or the like.

Figure 2:
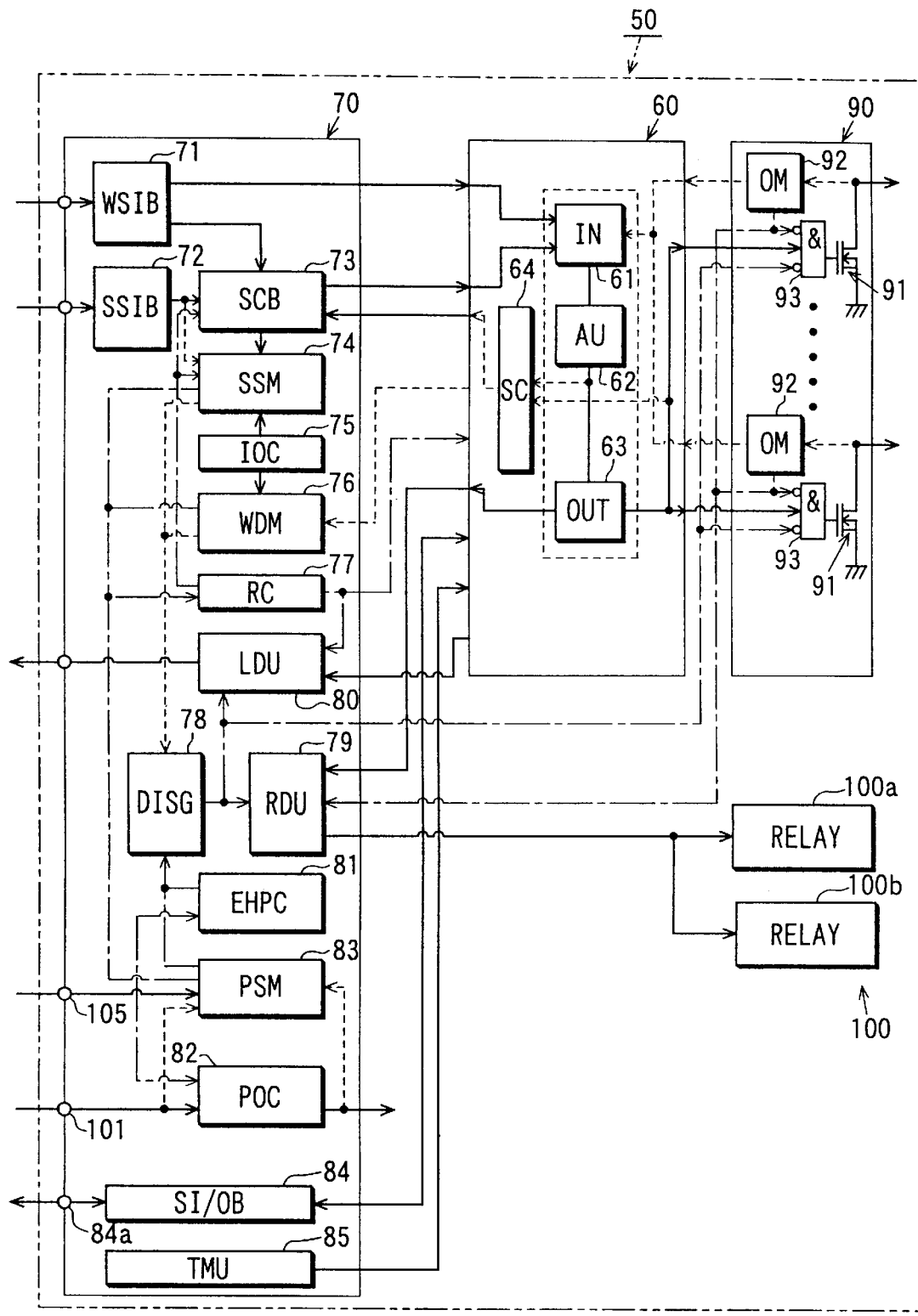
FIG. 2 is a block diagram illustrating the ECU for ABS control used in the first embodiment.

FIG. 2 illustrates a block diagram illustrating the internal structure of the ABS control ECU 50. As illustrated in this figure, the ABS control ECU 50 has a plurality of chips including a microcomputer 60, a peripheral IC 70, a solenoid driver 90 and a semiconductor relay 100 or the like.

Details of each structural device of the ABS control ECU 50 will then be described. Each arrow mark in a solid line in FIG. 2 indicates a control system line, each arrow mark in a broken line indicates a monitor system line, and each arrow mark in a chain line indicates an inhibit/shut-off system line. The control system line means that a device at the front end of the arrow mark is controlled based on a signal from a device at the rear end of the arrow mark. Moreover, the monitor system line means that a device at the front end of the arrow mark monitors whether a specified device fails or not based on a signal from a device at the rear end of the arrow mark. Moreover, the inhibit/shut-off system line means that a device at the front end of the arrow mark inhibits or shuts off a drive of a specified device based on an inhibit/shut-off signal from a device at the rear end of the arrow mark.

First, the microcomputer 60 comprises an input unit 61, an arithmetic unit 62, an output unit 63. When various information pieces such as the wheel speed signals are inputted to the input unit 61, the arithmetic unit 62 performs various arithmetic operations used for ABS control based on such various information inputs. The output unit 63 generates ABS control signals, that is, solenoid drive signals and motor drive signals based on the arithmetic operation. Moreover, the microcomputer 60 is also provided with a serial communication unit 64. When various signals produced in the arithmetic operation of the arithmetic unit 62 (for example, ABS control signal indicating the ABS control condition) are inputted, these various signals are converted to a serial signal and then sent to the peripheral IC 70 as the serial signal.

Next, the peripheral IC 70 comprises a wheel speed input buffer 71, a switch (SW) signal input buffer 72, a serial communication buffer 73, a serial communication monitoring unit 74, an internal oscillator circuit 75, a watch-dog (WD) monitoring unit 76, a reset control unit 77, a drive inhibit signal generating unit 78, a relay drive unit 79, a lamp drive circuit 80, an excessive-heating protection circuit 81, a power supply monitoring unit 82, a power supply output circuit 83, a signal input/output buffer 84 and a temperature monitoring unit 85. Each device circuit or unit is integrated into one chip to form the peripheral IC 70.

The wheel speed input buffer 71 performs waveform shaping to correct the detection signals transmitted from the wheel speed sensors 5 to 8 of FIG. 1 into a rectangular shape. The wheel speed signal shaped in the waveform by this wheel speed input buffer 71 is then inputted to the microcomputer 60 for various arithmetic operations of wheel speeds and estimated body speed used for ABS control. Moreover, the wheel speed input buffer 71 also detects a breakage of wire connecting the wheel speed sensors 5 to 8 and the ABS control ECU 50. This buffer 71 transmits a wire breakage signal indicating the breakage of wire to the serial communication buffer 73 when the wire breakage is detected.

The SW signal input buffer 72 monitors ON/OFF signal of the stop switch 29 and a signal indicating that the power is fed or not to the solenoids of the dual-position valves 21 to 24, 31 to 34 (for example, a voltage value applied on the solenoid) indicated in FIG. 1. Thereby, the ON/OFF signal indicating whether the brake pedal 27 is stepped on or not and the ON/OFF signal indicating whether the electric power is supplied to the solenoid or not can be outputted.

The serial communication buffer 73 converts a wire breakage signal from the wheel speed input buffer 71 and the ON/OFF signal from the SW signal input buffer 72 to the serial signal, and then transmits the serial signal to the microcomputer 60. A serial signal from the microcomputer 60 is then transmitted to this serial communication buffer 73.

The serial signal monitoring unit 74 monitors the microcomputer 60 based on the serial signal from the serial communication buffer 73. More specifically, the serial communication buffer 73 receives the result of arithmetic operation from the microcomputer 60 based on the signals from the wheel speed input buffer 71 and SW signal input buffer 72 to monitor whether this signal is normal or not. For example, when the signal indicating the ABS control condition is transmitted from the serial control unit 64 in spite that the OFF signal indicating that the stop switch 29 is not stepped on is transmitted from the SW signal input buffer 72, it is determined that the serial signal from the microcomputer 60 is not normal. When the serial signal from the microcomputer 60 is not normal, a reset signal is outputted to the reset control unit 77 described later or an inhibit signal is transmitted to the drive inhibit signal generating circuit 78.

The internal oscillator unit 75 forms an internal clock used in the serial signal monitoring unit 74 and the WD monitoring unit 76 or the like. In this internal oscillator unit 75, a plurality of clock signals are generated at different time points (timings) and the serial signal monitoring unit 74 and WD monitoring unit 76 select the clock signal of appropriate timing as a monitor signal to realize a monitoring function.

The WD monitoring unit 76 monitors whether the arithmetic operation in the microcomputer 60 is performed normally or not based on the data such as arithmetic operation period produced from the microcomputer 60. For example, since the WD monitor signal is produced as a signal that is alternately inverted when the arithmetic operation is performed normally, if the WD monitor signal is not inverted alternately, it indicates that the arithmetic operation of the microcomputer 60 is not executed normally. When the arithmetic operation of the microcomputer 60 is not executed in the normal period, a reset signal is outputted to the reset control unit 77 described later or the inhibit signal is transmitted to the drive inhibit signal generating circuit 78.

At the time of initialization or when the reset signal is inputted to the reset control unit 77 from the serial signal monitoring unit 74, WD monitoring unit 76 and power supply monitoring unit 83 described later, the reset signal is transmitted to the microcomputer 60. Upon reception of this reset signal, the microcomputer 60 sets the values thereof to a mode of a predetermined reset condition. For example, the microcomputer 60 stops all arithmetic operations. Moreover, this reset signal is also transmitted to the serial communication buffer 73 and serial signal monitoring unit 74 for the purpose of initialization based on this reset signal.

The drive inhibit signal generating unit 78 transmits a solenoid drive inhibit signal and a motor drive inhibit signal to the relay drive unit 79 based on the inhibit signals from the serial signal monitoring unit 74, the WD monitoring unit 76, the excessive-heating protection circuit 81 and power supply monitoring unit 83 described later and also transmits directly the drive inhibit signal to a solenoid drive driver 90 without via the microcomputer 60. Therefore, when the solenoid drive inhibit signal is transmitted from the drive inhibit signal generating unit 78, the drive of solenoids is inhibited even when the microcomputer 60 is in operation.

The relay drive unit 79 controls switching of a semiconductor relay unit 100 and also controls power supply to the motor to drive the solenoids and pumps 45a, 45b based on the solenoid drive signals and motor drive signal from the microcomputer 60. Moreover, when the solenoid drive inhibit signal and motor drive inhibit signal are inputted from the drive inhibit signal generating unit 78 and the output monitoring unit 92 of the solenoid driver 90, the relay drive unit 79 stops power supply to the solenoids and to the motor with the semiconductor relay unit 100.

The lamp drive unit 80 outputs under the normal condition the operating condition of the ABS control based on an ABS control condition signal from the microcomputer 60. However, it outputs a non-operating condition of the ABS control when the reset signal from the reset control unit 77 is inputted or when the solenoid drive inhibit signal and the motor drive inhibit signal are inputted from the drive inhibit signal generating unit 78. The lamp not illustrated lights up by receiving the signal from the lamp drive unit 80 to ensure the operating condition of the ABS control.

The excessive-heating protection circuit 81 detects that the chip has reached a predetermined temperature in order to prevent that the chip providing the peripheral IC 70 reaches the predetermined temperature. When the chip has reached the predetermined temperature, the drive inhibit signal generating unit 78 is caused to generate the inhibit signal and stop supply of voltage to the microcomputer 60 in view of preventing further temperature rise.

The power supply output circuit 82 corresponds to a monitored block and is connected to a power supply terminal (first power supply terminal) 101 and a ground terminal (first ground terminal) connected to an external power supply allocated at the outside of the ECU 50. The power supply output circuit 82 outputs a predetermined voltage (for example, 5V, 3.3V) based on the voltage applied to the power supply terminal 101. An output voltage of the power supply output circuit 82 is used as a power supply voltage of the microcomputer 60, the peripheral IC 70 and the solenoid driver 90 or the like.

The power supply monitoring unit 83 corresponds to a monitor block and is connected to a power supply terminal (second power supply terminal) 105 other than the power supply terminal 101 connected with the power supply output circuit 82 and a ground terminal (second power supply terminal). The power supply monitoring unit 83 monitors whether the output voltage of the power supply output circuit 82 is the predetermined value or not and also monitors whether the voltage applied to the power supply output circuit 82 is an excessive voltage or not. For example, when the output voltage of the power supply output circuit 82 is less than the predetermined voltage, a reset signal is transmitted to the reset control unit 77. When it is higher than the predetermined value, an inhibit signal is transmitted to the drive inhibit signal generating unit 78. Moreover, the voltage applied to the power supply output circuit 82 is excessive, the inhibit signal is outputted to the drive inhibit signal generating unit 78 and supplying of voltage to the microcomputer 60 is stopped to prevent excessive-heating.

The signal input/output buffer 84 is connected to a terminal 84a for checking for diagnosis when a car has a failure and makes communication with the microcomputer 60 by connecting a tester to the terminal 84a. Moreover, the signal input/output buffer 84 may be used as only an output buffer, for example, as a buffer which outputs the signal for indicating a vehicle speed displayed on a vehicle speed meter (for example, a signal corresponding to the estimated vehicle speed calculated from the wheel speed).

The temperature monitoring unit 85 always detects temperature of the ECU 50. The temperature monitoring unit 85 outputs the signal depending on the temperature of ECU 50 to the microcomputer 60 as a temperature detection signal. Based on this temperature detection signal, the microcomputer 60 performs the arithmetic operation for the ABS control depending on the detected temperature.

The solenoid driver 90 comprises MOS transistors 91 connected to the solenoids, output monitoring units 92 for monitoring voltage supply condition to the solenoids (MOS transistors 91) and AND circuits 93 for ON/OFF drive of the MOS transistors 91. The MOS transistors 91 are connected to the respective solenoids of the various control valves 21 to 24, 31 to 34 illustrated in FIG. 1 to execute switching for voltage supply.

The output monitoring units 92 are provided on one-to-one basis to the solenoids to monitor a drive output to each solenoid. For example, it monitors the voltage supply condition to the solenoid based on the drain voltage and drain current of the MOS transistor 91. Thereby, for example, it is detected whether a drain current is excessive or not and whether a power supply wire to the solenoid is open or not or the current is leaking or not, and moreover whether the MOS transistor 91 is in the excessively high temperature or not. Thereby, if the result not suitable for driving the solenoid is attained, the output monitoring unit 92 transmits the solenoid drive inhibit signal and the motor drive inhibit signal to the relay drive unit 79 and also outputs the solenoid drive inhibit signal to the AND circuit 93.

To the AND circuit 93, an output signal of the microcomputer 60, an output signal from the relay drive unit 79, an output signal from the drive inhibit signal generating unit 78 and an output signal from the output monitoring unit 92 are inputted. In the case of this embodiment, the output signals from the relay drive unit 79, the drive inhibit signal generating unit 78 and the output monitoring unit 92 are normally at low level. However, if any failure occurs, it turns to high level and the output of the AND circuit 93 becomes low, that is, the MOS transistor 91 turns off.

Thus, the solenoid driver 90 not only shuts off the power supply to the solenoid based on the signal from the microcomputer 60 and peripheral IC 70 but also shuts off the power supply to the solenoid based on the signal from the output monitoring unit 92 provided within the solenoid driver 90 itself.

In the semiconductor relay unit 100, the power supply to the solenoids is switched by a semiconductor relay 100a, while the power supply to the motor to drive the pumps 45a, 45b is switched by a semiconductor relay 100b. These semiconductor relays 100a, 100b are constructed to be controlled on the basis of the signal from the relay drive unit 79 to normally enable power supply to the solenoids and the motors and to disable the power supply to the solenoids and the motors upon reception of the solenoid drive inhibit signal and the motor drive inhibit signal from the relay drive unit 79.

Figure 3:
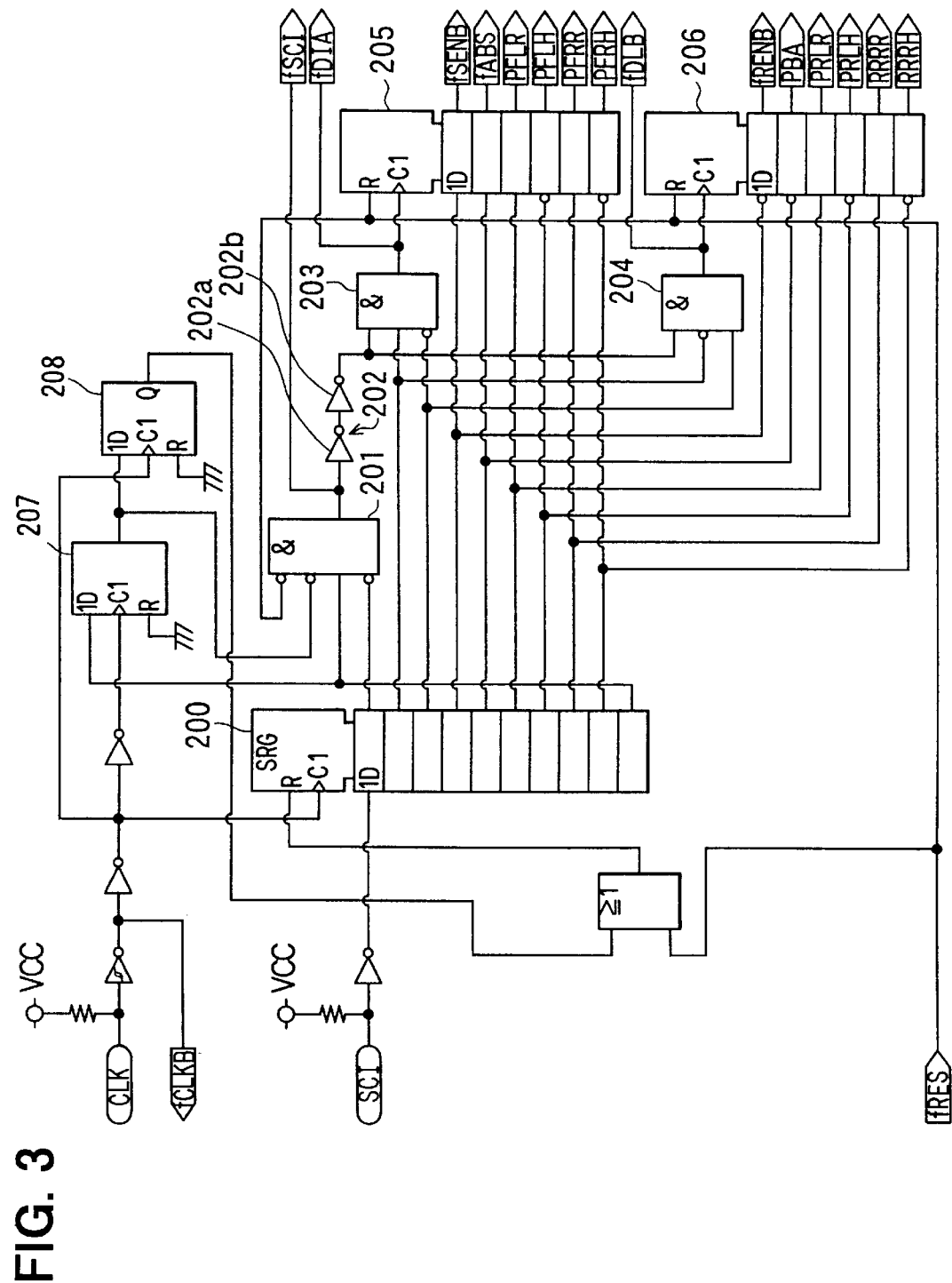
FIG. 3 is a circuit diagram illustrating a part of a serial communication buffer used in the ECU shown in FIG. 2.

A part of the serial communication buffer 73 is shown in FIG. 3. As illustrated in FIG. 3, a synchronous clock signal CLK outputted from the microcomputer 60, a serial signal SCI transmitted from the serial communication unit 64 of the microcomputer 60 and a reset signal fRES from the reset control unit 77 are inputted to the serial communication buffer 73.

The data transmitted together with an ID number A and data transmitted together with an ID number B are stored respectively in different registers 205, 206 provided in the serial communication buffer 73 by giving, for example, the ID numbers A and B to the serial signal SCI transmitted from the serial communication unit 64.

When the serial signal SCI is transmitted, it is stored in a shift register 200. When the serial signal is completely stored in the shift register 200, an output of the final digit becomes high level. Thereby, an output of the AND circuit 201 becomes high level and the receiving signal fSCI notifying reception of a certain signal becomes high level. Moreover, the high level is outputted to an AND circuit 203 and an AND circuit 204 via a delay circuit 202 formed of inverter circuits 202a, 202b of the even number.

When this signal is inputted, both AND circuits 203 and 204 generate outputs by receiving signals of the second digit and third digit bits of the shift register 200. That is, when the data having the ID number A is received, the AND circuit 203 outputs the high level while the AND circuit 204 outputs the low level. When the data having the ID number B is received, the AND circuit 203 outputs the low level and the AND circuit 204 outputs the high level, respectively. These outputs of the AND circuits 203 and 204 respectively correspond to the signal fDIA notifying whether the data of ID number A is inputted or not and the signal fDIB notifying whether the data of the ID number B is inputted or not.

As described above, when the data having the ID number A is received, the register 205 receives the high level output from the AND circuit 203 to store the content stored in each bit of the shift register 200. Moreover, when the data having ID number B is received, the register 206 receives the high level output from the AND circuit 204 to accommodate the data stored in each bit of the shift register 200.

These shift registers 205, 206 generate outputs depending on the data stored in each bit for every bit. Specifically, the first digit bit of the register 205 outputs a cancellation request signal fSENB of the solenoid drive inhibit signal to the drive inhibit signal generating unit 78 and the second digit bit outputs a signal fABS notifying the ABS control condition. The third digit bit outputs a signal PFLR notifying the driving condition of the dual-position valve 32 of the FL wheel 2. Moreover, the fourth digit bit outputs a signal PFLH notifying the driving condition of the dual-position valve 22 of the WL wheel 2. Moreover, the fifth digit bit outputs a signal PFRR notifying the driving condition of the dual-position valve 31 of the FR wheel 1 and the sixth digit bit outputs a signal PFRH notifying the driving condition of the dual-position valve 21 of the FR wheel 1.

The first digit bit of the register 206 outputs an acknowledgment signal fRENB permitting an output of the relay drive unit 79, while the second digit bit outputs a signal fBA notifying the brake assisting control condition, the third digit bit outputs a signal PRLR notifying the driving condition of the dual-position valve 34 of the RL wheel 4, the fourth digit bit outputs a signal PRLH notifying the driving condition of the dual-position valve 24 of the RL wheel, the fifth digit bit outputs a signal PRRR notifying the driving condition of the dual-position valve 33 of the RR wheel 3 and the sixth digit bit outputs a signal PRRH notifying the driving condition of the dual-position valve 23 of the RR wheel 33.

As described above, the serial signal SCI transmitted from the microcomputer 60 is received by the serial communication buffer 73 and various signals depending on this received data are outputted to the serial signal monitor unit 74 from the serial communication buffer 73.

D-type flip-flops 207, 208 are provided for setting the timing to transmit the data in the shift register 200 to the register 205 or 206. A signal fRES is the reset signal from the reset control unit 77 and is set to high level when a fault or failure occurs during the initialization or the other operation (at the time of fail-safe).

A logic circuit for processing the input signal from the wheel speed input buffer 71 and the signal from the SW signal input buffer 72 is not described. However, this logic circuit is the well known serial communication logic circuit in the serial communication buffer 73, and forms the serial signals of a wire break detection signal from the wheel speed input buffer 71 and various switch signals from the SW signal input buffer 72 thereby to transmit such signals to the microcomputer 60 as the serial signals.

Figure 4A:
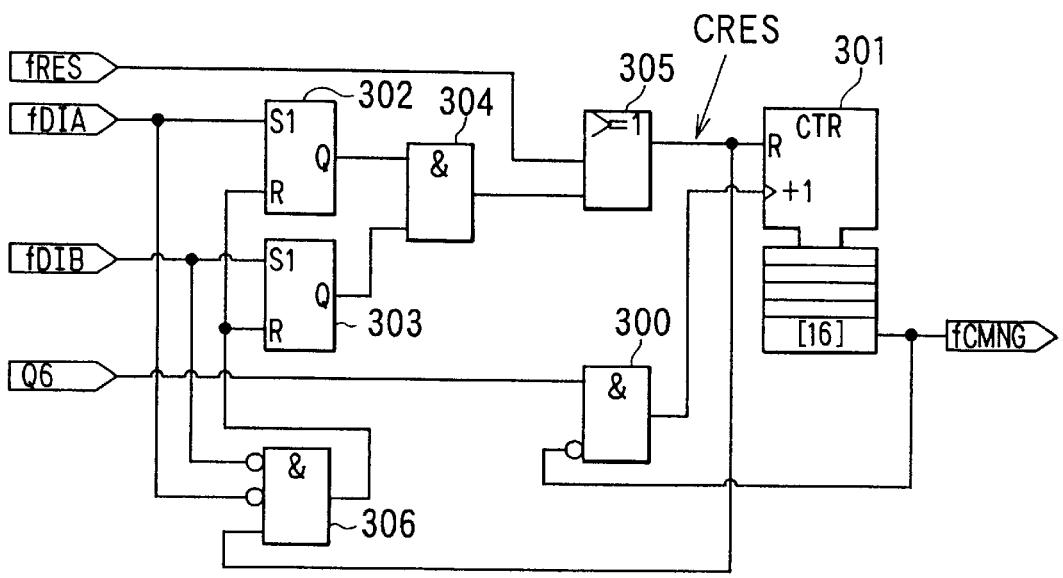
FIG. 4A is a circuit diagram illustrating an interval monitoring logic circuit.

The serial signal monitor unit 74 is shown in FIG. 4A to FIG. 7A. The logic circuit illustrated in FIG. 4A is an interval monitoring logic circuit for monitoring a processing interval in the microcomputer 60.

A signal Q6 illustrated in this figure is one of various clock signals outputted from the internal oscillation circuit 75. When an output of an AND circuit 300 becomes high level synchronously with a rise of the signal Q6, a counter 301 receives this output and counts up its count. Moreover, when the signal fDIA notifying reception of the data having ID number A and the fDIB notifying reception of the data having ID number B are inputted, an AND circuit 304 outputs a high level by receiving the high level output from RS flip-flops 302, 303. An OR circuit 305 also outputs a high level.

Therefore, when the counter 301 is counting up the signal depending on the pulse of signal Q6, the counter 301 is reset and repeats the counting up and resetting depending on the pulse of signal Q6 so long as the signal fDIA and signal fDIB are received normally. If the signal fDIA and signal fDIB are not received normally, the counter 301 is not reset and counts up to the final digit of the signal.

Therefore, the communication failure condition can be detected from the signal fCMNG outputted from the counter 301. In the case of this logic circuit, when the signals fDIA, fDIB are received normally, the signal fCMNG becomes low level. When the communication failure occurs, this signal becomes high level.

An output of the OR circuit 305 is inputted to the AND circuit 306 and the RS flip-flops 302,303 are reset depending on an output from the AND circuit 306. That is, when the signals fDIA, fDIB are received normally, the RS flip-flops 302, 303 are reset. Moreover, the signal fRES is the reset signal from the reset control unit 77 and is set to high level when a fault occurs at the time of initialization or in the operations.

Figure 4B:
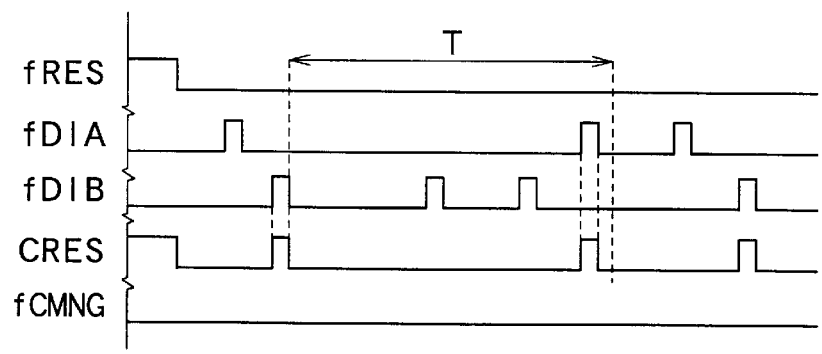
FIG. 4B and FIG. 4C are timing diagrams illustrating signals produced in the logic circuit shown in FIG. 4A.
Figure 4C:
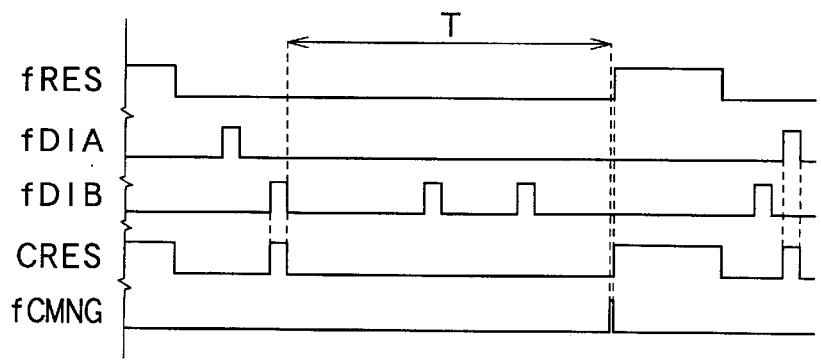

FIGS. 4B and 4C illustrate the timing diagrams in the case where the signals fDIA, fDIB are received normally and not, respectively. As illustrated in FIG. 4B, when the signals fDIA, fDIB are received normally during a period T up to completion of counting of the counter 301, the output signal CRES of the OR circuit 305 becomes high level and the signal fCMNG does not become high level. On the other hand, as illustrated in FIG. 4C, if the signals fDIA, fDIB are not received normally during the period T, the output signal CRES of the OR circuit 305 is maintained at the low level and thereby counting of the counter 301 is continued up to the final digit and the signal fCMNG becomes high level.

As described above, it is possible to monitor the interval of the arithmetic operations in the microcomputer 60 using the logic circuit illustrated in FIG. 4A.

Figure 5A:
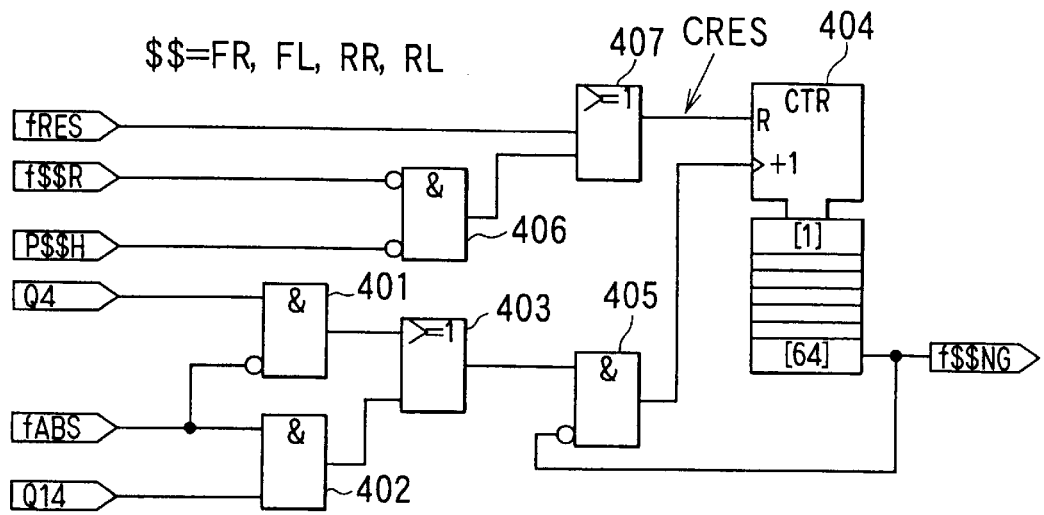
FIG. 5A is a circuit diagram illustrating a microcomputer fault monitoring logic circuit.

The logic circuit illustrated in FIG. 5A is one of the arithmetic operation result monitoring logic circuits for monitoring the result of arithmetic operations in the microcomputer 60. Here, it is monitored whether the dual-position valves 21 to 24, 31 to 34 for the wheels 1 to 4 (control wheels) as the ABS control object are normally driven or not.

In the following explanation, a signal notifying the drive condition of the pressure increasing control valves 21 to 24 among the dual-position valves 21 to 24, 31 to 34 corresponding to the control wheels are defined as a signal P$$H, while a signal notifying the drive condition of the pressure decreasing control valves 31 to 34 is defined as a signal P$$R. However, $$ means the control wheel (FL, FR, FL, RR) and for example, a signal PFLH is a signal notifying the driving condition of the pressure increasing control valve 22 when the control wheel is RL wheel 2. Moreover, signals Q4, Q14 in the figure are respectively one of a plurality of clock signals outputted from the internal oscillation circuit 75 and a signal Q4 is a clock signal generated at an earlier timing than that of the signal Q14.

(1) It is assumed that the microcomputer 60 is operating in the normal condition.

The signal fABS notifying the ABS control condition becomes low level when the ABS control is not carried out. Therefore, an AND circuit 401 outputs a high level corresponding to a rise of the pulse of the signal Q4, while an AND circuit 402 outputs a low level without relation to the signal Q14.

Therefore, an OR circuit 403 to which outputs of the AND circuits 401, 402 are inputted outputs a high level depending on the rise of pulse of the signal Q4. Moreover, a counter 404 outputs a low level because the counting is not performed by receiving the signal fRES from the reset control unit 77 at the time of initialization. Therefore, an AND circuit 405 outputs a high level based on the high level output from the OR circuit 403, that is, depending on the rise of pulse of the signal Q4. Thereby, the counter 404 executes the counting.

When the control wheel is not in the ABS control condition, the solenoid drive signal P$$H of the pressure increasing control valves 21 to 24 of the control wheel and the solenoid drive signal P$$R of the pressure decreasing control valves 31 to 34 become low level and the output of the AND circuit 406 becomes high level. Therefore, not in the ABS control condition, the output signal CRES of the OR circuit becomes high level during the period until the end of the counting of the counter 404 and thereby the counter 404 is reset.

Meanwhile, in the ABS control condition, the signal fABS notifying the ABS control condition becomes high level. Therefore, the AND circuit 402 outputs the high level depending on rise of pulse of the signal Q14 and the AND circuit 401 outputs the low level without relation to the signal Q4.

Therefore, the OR circuit 403 to which outputs of the AND circuits 401, 402 are inputted outputs the high level depending on rise of the pulse of signal Q14. Since the counter 404 outputs the low level at the time of initialization, the AND circuit 405 outputs high level based on the high level output from the OR circuit 403, that is, rise of pulse of the signal Q14. Thereby, the counter 404 starts the counting operation.

On the other hand, when the control wheel is in the ABS control condition, the solenoid drive signal P$$H of the pressure increasing control valves 21 to 24 of the control wheel and the drive signal P$$R of the pressure decreasing control valves 31 to 34 are inverted respectively to the high level and low level considering the pressure increasing and decreasing timings of the ABS control and thereby an output of the AND circuit 406 is also inverted to high level and low level.

Therefore, even in the ABS control condition, the output signal CRES of the OR circuit becomes high level during the period up to the end of counting of the counter 404 and thereby the counter 404 is reset.

(2) It is assumed next that the microcomputer 60 is operating in the abnormal condition.

For example, when the signal (that is, any one of the signal P$$H, signal P$$R is high level) notifying the drive of solenoid of the dual-position valves 21 to 24, 31 to 34 corresponding to the control wheel by the microcomputer 60 is outputted even not in the ABS control condition, it is assumed that the arithmetic operation result of microcomputer 60 is erroneous, resulting in a fault therein.

In this case, the signal fABS notifying the ABS control condition becomes low level and the counter 404 starts the counting operation depending on the rise of pulse of the signal Q4 as described above.

Meanwhile, the solenoid drive signal P$$H of the pressure increasing control valves 21 to 24 of the control wheel and the solenoid drive signal P$$R of the pressure decreasing control valves 31 to 34 are inverted to high level and low level respectively in the pressure increasing and decreasing timings of the ABS control and the output of AND circuit 406 is also inverted to high level and low level.

However, since the counter 404 starts the counting operation with the rise of pulse of the signal Q4, it starts the counting quicker than that in the ABS control condition and thereby the counter 404 counts up to the final digit before the output of the AND circuit 406 becomes high level. Therefore, a fault of the arithmetic operation result of the microcomputer 60 can be detected from the signal f$$NG outputted from the counter 404.

When the pressure increasing timing does not occur even if the pressure increasing timing should occur during the ABS control, for example, when the pressure increasing timing does not occur during a predetermined period, it is assumed that a fault occurs in the arithmetic operation of the microcomputer 60.

In this case, the signal fABS notifying the ABS control condition becomes high level and the counter 404 also starts the counting operation depending on rise of pulse of the signal Q14 as described above.

Meanwhile, when there is no pressure increasing timing of the ABS control, an output of the AND circuit 406 is maintained at the low level. Therefore, even in this case, a fault of the arithmetic condition of the microcomputer 60 can be detected from the signal f$$NG outputted from the counter 404.

Figure 5B:
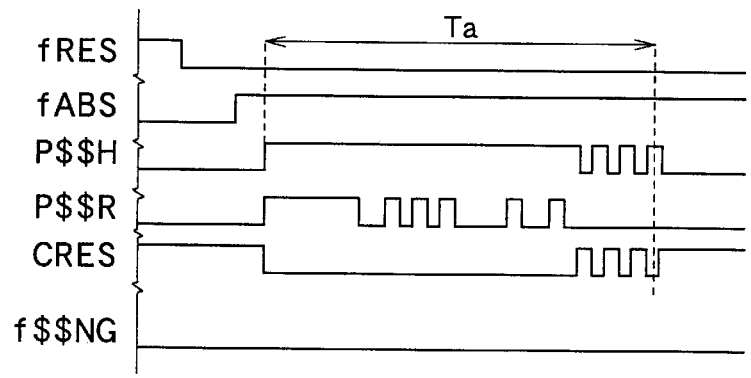
FIG. 5B and FIG. 5C are timing diagrams illustrating signals produced in the logic circuit shown in FIG. 5A.
Figure 5C:
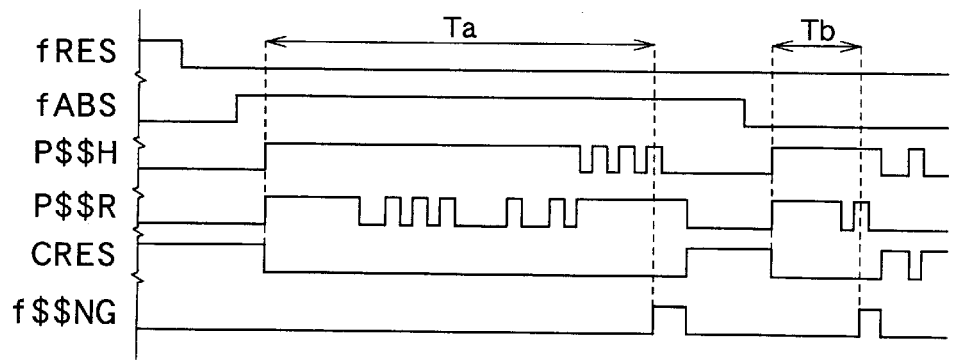

FIG. 5B and FIG. 5C illustrate timing diagrams when the microcomputer 60 is conducting the normal arithmetic operation and is not conducting the normal arithmetic operation, respectively.

As illustrated in FIG. 5B, the counter 404 is always reset when the ABS control is not executed and the counter 404 is reset in the pressure increasing and decreasing timing of the ABS control when the ABS control is executed. As illustrated in FIG. 5C, if the pressure increasing timing does not appear even when the pressure increasing timing should appear during the ABS control condition, when the period Ta passes, the signal f$$NG becomes high level. Moreover, when the solenoids of the dual-position valves 21 to 24, 31 to 34 are driven while the ABS control is not executed, the signal f$$NG becomes high level after the period Tb passes.

In this logic circuit, the period Tb is set shorter than the period Ta to immediately inhibit an output of the solenoid drive driver 90 because a fault is surely found in the arithmetic operation result of the microcomputer 60 when the solenoid drive signal is outputted in the period Tb even not in the ABS control condition. As described above, it is now possible to monitor the arithmetic operation result of the microcomputer using the logic circuit illustrated in FIG. 5A.

Figure 6A:
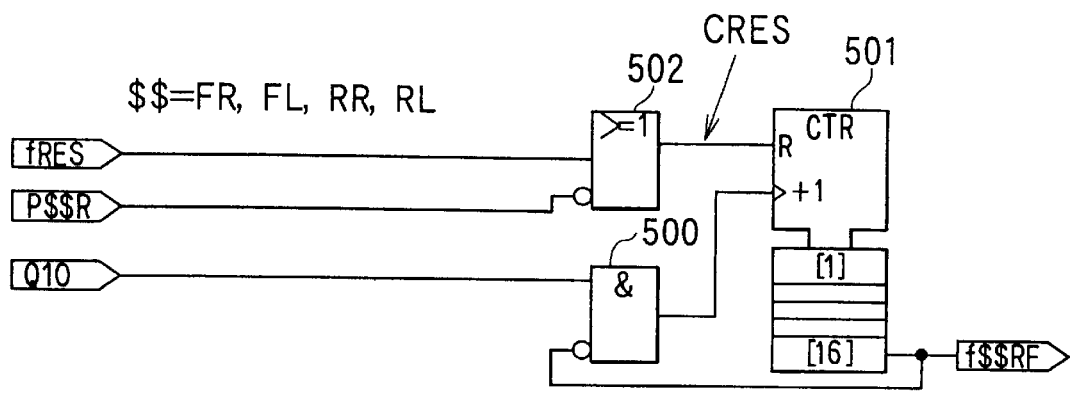
FIG. 6A is a circuit diagram illustrating a microcomputer fault monitoring logic circuit for the ABS control.

A logic circuit illustrated in FIG. 6A is also one of the arithmetic operation result monitoring logic circuits for monitoring the arithmetic operation result of the microcomputer 60. Here, it is monitored whether the pressure decreasing control valves 31 to 34 for the control wheel under the ABS control are driven normally or not. Namely, even during the ABC control condition, if the pressure decreasing time is too long, a driver feels, even when the driver steps the brake pedal down, a fear for insufficient effectiveness of the brake. Therefore, if the pressure decreasing time is too long, it is defined as the microcomputer 60 is in the fault condition.

A signal Q10 illustrated in FIG. 6A is one of a plurality of clock signals outputted from the internal oscillation circuit 75. When an output of an AND circuit 500 becomes high level corresponding to a rise of pulse of the signal Q10, a counter 501 receives this high level output to start the counting operation.

When the pressure decreasing period is normal, since the solenoid drive signal P$$R of the pressure decreasing control valves 31 to 34 corresponding to the control wheel becomes low level before the counter 501 counts up to the final digit, an output of an OR circuit 502 becomes high level and thereby the counter 501 is reset. However, if the pressure decreasing period becomes excessively long, the counter 501 counts up to the final digit before the solenoid drive signal P$$R of the pressure decreasing control valves 31 to 34 corresponding to the control wheel becomes low level. Therefore, a fault in the arithmetic operation result of the microcomputer 60 can be detected from the signal f$$RF outputted from the counter 501.

Figure 6B:
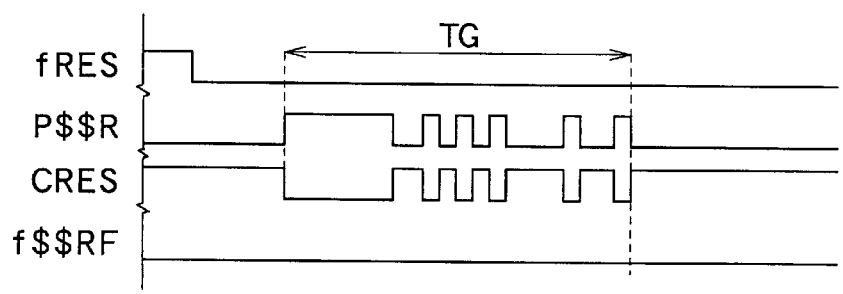
FIG. 6B and FIG. 6C are timing diagrams illustrating signals produced in the logic circuit shown in FIG. 6C.
Figure 6C:
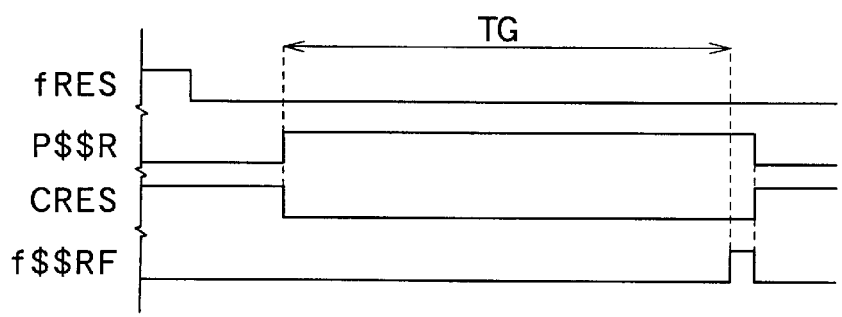

FIGS. 6B and 6C illustrate the timing diagrams when the pressure decreasing period is in the normal length and is in the excessively longer length, respectively.

As illustrated in FIG. 6B, when the pressure decreasing period is in the normal length (shorter than the period $T_G$ in the figure), the output signal CRES of the OR circuit 502 becomes high level and the signal f$$RF does not become high level before the counter 501 counts up to the final digit. Meanwhile, as illustrated in FIG. 6C, when the pressure decreasing period is excessively long (longer than a period TG in the figure), since the output signal of the OR circuit 502 is low level until the counter 501 counts up to the final digit, the signal f$$RF becomes high level. As described above, it is now possible to monitor the arithmetic operation result of the microcomputer 60 using the logic circuit illustrated in FIG. 6.

Figure 7A:
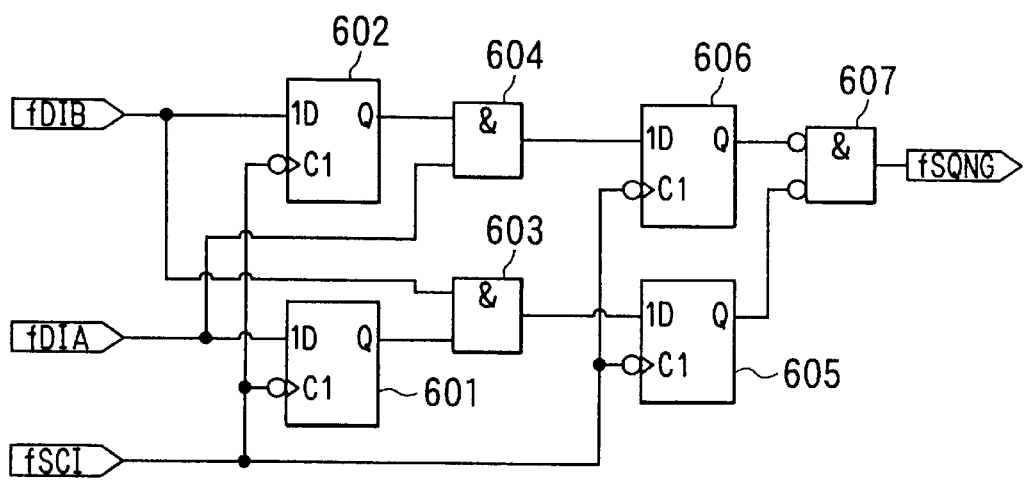
FIG. 7A is a circuit diagram illustrating a sequence monitoring logic circuit.

A logic circuit illustrated in FIG. 7A is a sequence monitoring logic circuit for monitoring the sequence of the data transmitted from the microcomputer 60. That is, since it is assumed that the serial signal transmitted from the microcomputer 60 is not transmitted accurately if the data having ID number A and the data having ID number B are not received alternately, the microcomputer 60 is assumed to be in the fault condition in this case.

Figure 7B:
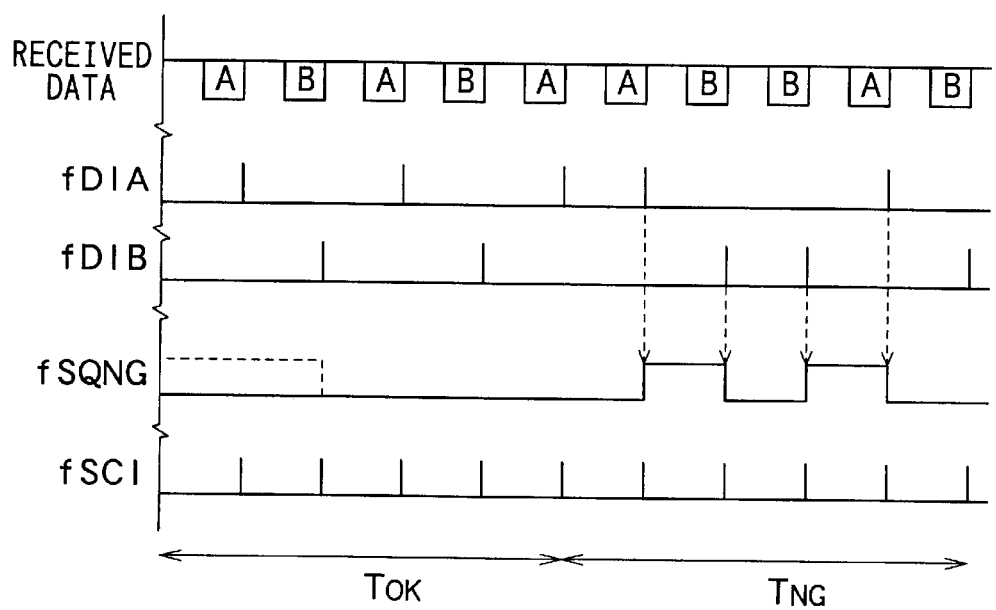
FIG. 7B is a timing diagram showing signals produced in the logic circuit shown in FIG. 7A.

As illustrated in a period TOK in FIG. 7B, the alternate reception of the data having ID number A and the data having ID number B will be described.

When the data having ID number A is received, the signal fSCI notifying the reception of a certain signal and the signal fDIA notifying the reception of the ID number A become high level. Therefore, an output of a D type flip-flop 601 becomes high level to store that the signal fDIA is inputted.

When the data having ID number B is received, the signal fSCI notifying the reception of a certain signal and the signal fDIB notifying the reception of the ID number B become high level. Therefore, an output of a D type flip-flop 602 becomes high level to store that the signal fDIB is inputted. Moreover, since the D type flip-flop 601 has already outputted the high level until this timing, an output of an AND circuit 603 becomes high level when the signal fDIB becomes H level. That is, the AND circuit 603 determines that signals are received in the sequence of the signal fDIA and the signal fDIB. Simultaneously, an output of a D type flip-flop 605 becomes high level by receiving the high level signal from the AND circuit 603 and the high level signal fSCI and thereby the condition of the AND circuit 603 is stored. When the signal fSCI becomes high level, the signal fDIA becomes low level. Therefore, an output of the D type flip-flop 601 returns to the low level.

Subsequently, when the data having ID number A is received, the signal fSCI and the signal fDIA become high level as described above. Therefore, an output of the D type flip-flop 601 is set to the high level to store that the signal fDIA is inputted. Moreover, since the D type flip-flop 602 outputs the high level, an output of an AND circuit 604 becomes high level when the signal fDIA becomes high level. That is, the AND circuit 604 determines the reception of signals in the sequence of the signal fDIB and the signal fDIA. Simultaneously, an output of a D type flip-flop 606 becomes high level by receiving the high level output from the AND circuit 604 and the high level signal fSCI to store the condition of the AND circuit 604. Here, since the signal fDIB is low level when the signal fSCI becomes high level, an output of the D type flip-flop 602 returns to the low level.

Therefore, when the data is received in the sequence of the signal fDIA and then the signal fDIB, an output of the D type flip-flop 605 becomes high level and when the data is received in the sequence of the signal fDIB and then the signal fDIA, an output of a D type flip-flop 606 becomes high level. Therefore, when two data are received alternately, an output of an AND circuit 607 becomes low level.

On the other hand, when the data having ID number A is received continuously like the period TNG of FIG. 7B, after the signal fDIA becomes high level and then the signal fDIA becomes high level subsequently. Moreover, when the data having ID number B is received continuously, the signal fDIB becomes high level and thereafter the signal fDIB becomes H level subsequently. Therefore, both outputs of the AND circuit 603 and the AND circuit 604 become low level.

Accordingly, outputs of the D type flop-flops 605 and 606 become low level and the signal fSQNG outputted from the AND circuit 607 becomes high level in order to detect a fault in the data transmission sequence of the microcomputer 60 from the signal fSQNG. As described above, it is possible to monitor the sequence of the microcomputer 60 using the logic circuit of FIG. 7A.

As described above, various monitoring operations, such as monitoring for a fault of the arithmetic operation result of interval of arithmetic operations of the microcomputer 60 and monitoring for the sequence of data transmitted from the microcomputer 60 can be made through the data communication from the microcomputer 60.

As described above, a fault of the microcomputer 60 can be monitored easily even if two microcomputers are not provided by monitoring whether the data communication from the microcomputer 60 is executed surely or not or whether content of data transmitted is accurate or not through the data communication to the peripheral IC 70 from the microcomputer 60. Moreover, since various monitoring operations can be realized through data communication from the microcomputer 60, sufficient monitoring capability can be attained in comparison with the WD monitoring operation.

Therefore, a fault of the microcomputer 60 can be monitored easily and effectively based on the data communication to the peripheral IC 70 from the microcomputer 60 and moreover the microcomputer 60 can be monitored with a more low cost structure.

The monitoring result of the serial signal monitor unit 74 is transmitted to the drive inhibit signal generating unit 78 directly or when the signal notifying a fault of the microcomputer 60 continues for a predetermined period or for a plurality of times. Upon reception of this monitoring result, the drive inhibit signal generating unit 78 outputs the solenoid drive inhibit signal and motor drive inhibit signal.

(Second Embodiment)

In the above embodiment, the one-way communication for data communication to the peripheral IC 70 from the microcomputer 60 has been described but this embodiment will explain the two-way communication including the data communication to the microcomputer 70 from the peripheral IC.

Figure 8:
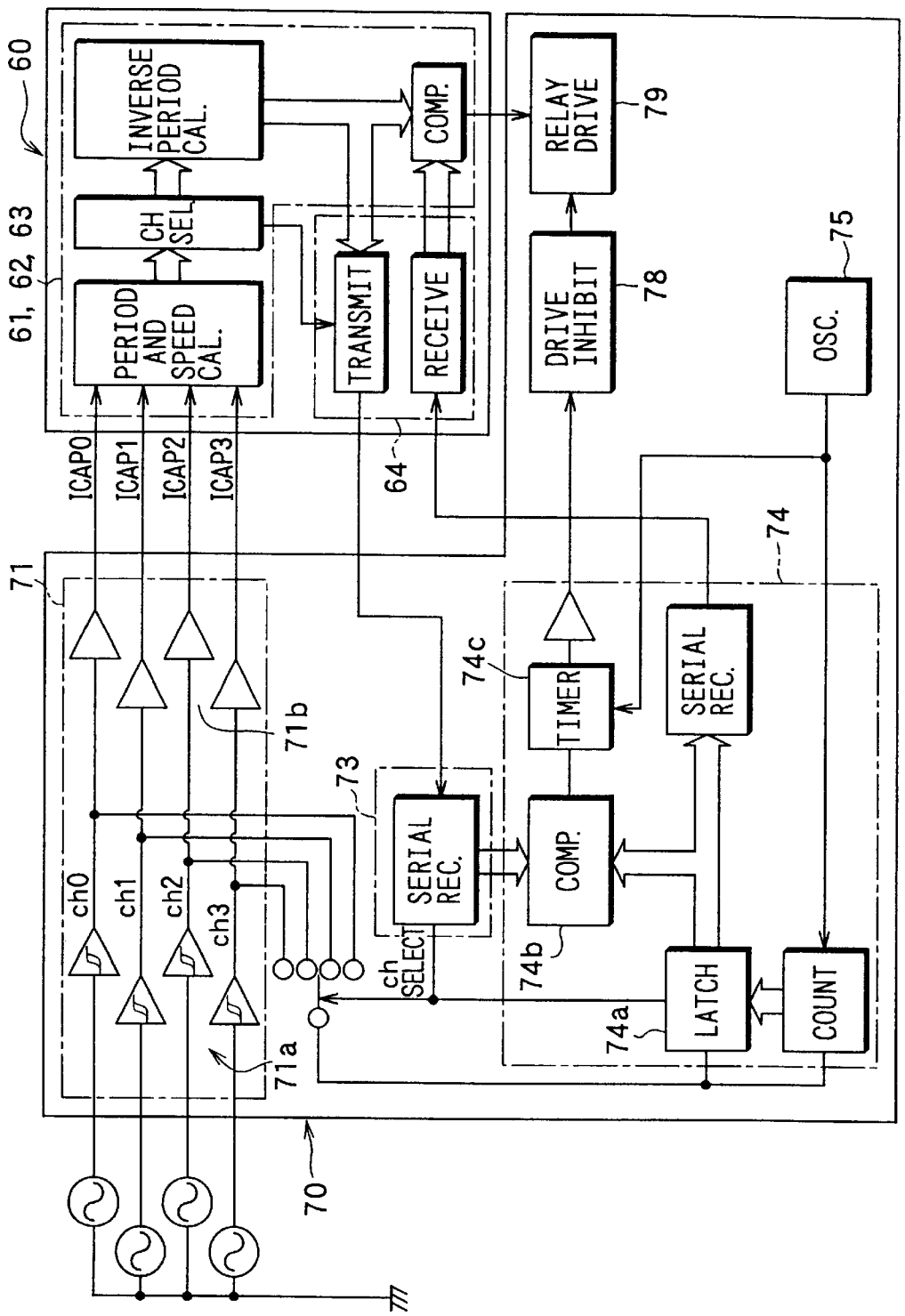
FIG. 8 is a circuit diagram illustrating a wheel speed calculation monitoring circuit according to a second embodiment of the present invention.

In this embodiment, as an example of the two-way communication, the method of monitoring the wheel speed arithmetic operation conducted by the microcomputer 60 will be described. FIG. 8 illustrates an ECU for ABS control to be used to monitor the wheel speed arithmetic operations.

When the wheel speed signal from each wheel 1 to 4 is inputted to the wheel speed input buffer 71 of the peripheral IC 70, the input wheel speed signal is converted to the rectangular waveform after noise cancellation by a rectangular wave converting unit 71a. This wheel speed signal converted to the rectangular waveform is inputted to the microcomputer 60 via a buffer 71b. The buffer 71b isolates the signal outputted to the microcomputer 60 from the signal pulse-counted in the peripheral IC 70.

The period of the wheel speed signal inputted from the microcomputer 60 is measured and the result is converted to the wheel speed data for use as the control parameter of the system. On the other hand, the microcomputer 60 and the peripheral IC 70 execute the following processing to monitor the normal conversion to the wheel speed data of the microcomputer 60.

(1) The microcomputer 60 selects a channel (CH) of the wheel to be monitored. Moreover, it also inversely executes the arithmetic operation for a period of the wheel speed signal from the wheel speed data of the selected channel. The selected channel data and the inversely calculated period data are transmitted to the peripheral IC 70 from the serial communication unit 64.

(2) The peripheral IC 70 measures the period of the converted rectangular pulse of the wheel speed signal selected by the serially received data of the selection channel with a period measuring circuit 74d and latches such data by a latch circuit 74a.

The latch data and the serially received and inversely calculated period data are compared whether these are within the specified range or not with the comparison circuit 74b. When the result of determination does not become normal within the specified period of a timer 74c of the later stage, the microcomputer 60 determines occurrence of a fault and transmits the solenoid drive inhibit signal and motor drive inhibit signal to a relay drive unit 79 via a drive inhibit signal generating unit 78.

Moreover, when the serial signal transmitted from the peripheral IC 70 is received by the microcomputer 60, this received data is compared with the inversely calculated period data. If the specified difference cannot be obtained within the specified period, it is defined as a fault of the microcomputer 60. Thereby the solenoid drive inhibit signal and motor drive inhibit signal are transmitted to the relay drive unit 79.

As described above, it is also possible to monitor whether the period measurement and arithmetic operation of the wheel speed are executed accurately or not in both the peripheral IC 70 and microcomputer 60 by conducting the period measurement of wheel speed signal in both microcomputer 60 and peripheral IC 70.

In this embodiment, period measurement and wheel speed calculation of the wheel speed signal are described but it is also possible to monitor the signals other than the wheel speed signal when it varies periodically in the same manner in this embodiment.

(Other Embodiments)

In the first and second embodiments described above, the data communication from the microcomputer 60 is executed with the serial communication, but such data communication can also be realized with the parallel communication.

Moreover, in above first and second embodiments, as illustrated in FIG. 2, an integrated circuit is constructed with a plurality of chips, but the structure illustrated in FIG. 2 is not always required and any one of a plurality of chips or all chips may be formed of one chip. In this case, the part for conducting calculation for control corresponds to the microcomputer 60 and the part allocated in the peripheral area corresponds to the peripheral IC 70.

Moreover, in the first embodiment, the one-way communication for data communication to the peripheral IC 70 from the microcomputer 60 is described and the two-way communication is also possible as described in the second embodiment. For example, it is also possible to transmit the result of monitoring operation in the serial signal monitor unit 74 to the microcomputer 60.

In addition, in the first embodiment, it has been described as to whether the calculation for ABS control is conducted normally or not. However, in the case of ECU used for the brake apparatus comprising a brake assisting function, it can also be monitored whether the microcomputer 60 normally executes the calculation for the brake assisting function or not. For example, for the structure illustrated in FIG. 1, the first embodiment can be applied to the ECU adapted to the brake apparatus comprising the piping for connecting the master cylinder 16 or the master reservoir and the inlet port sides of the pumps 45a, 45b and control valves between each port of the master cylinder and the dual-position valves 21 to 24.

Figure 9A:
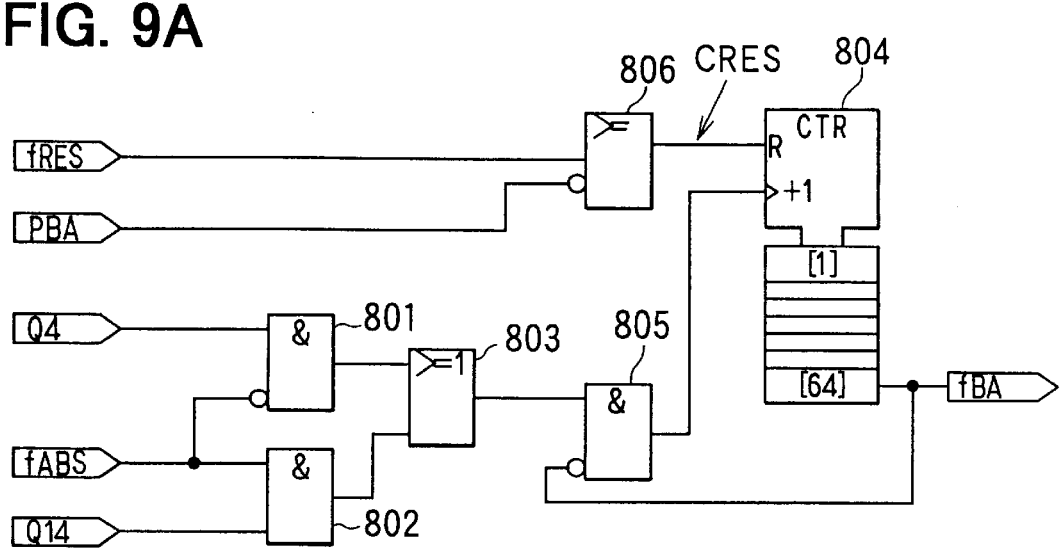
FIG. 9A is a circuit diagram illustrating a microcomputer fault monitoring logic circuit for a brake assisting control.
Figure 9B:
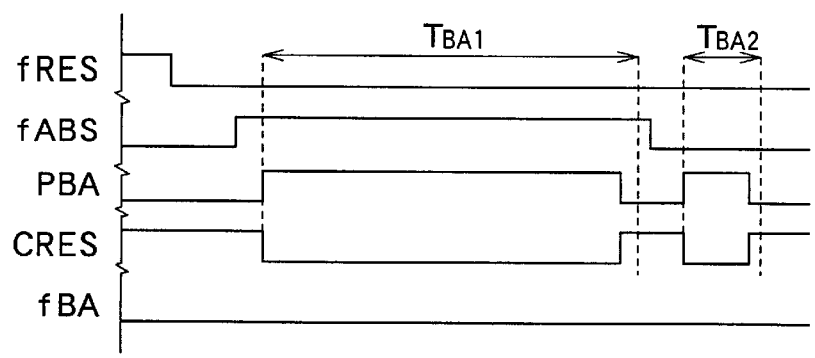
FIG. 9B and FIG. 9C are timing diagrams showing signals produced in the logic circuit shown in FIG. 9A.
Figure 9C:
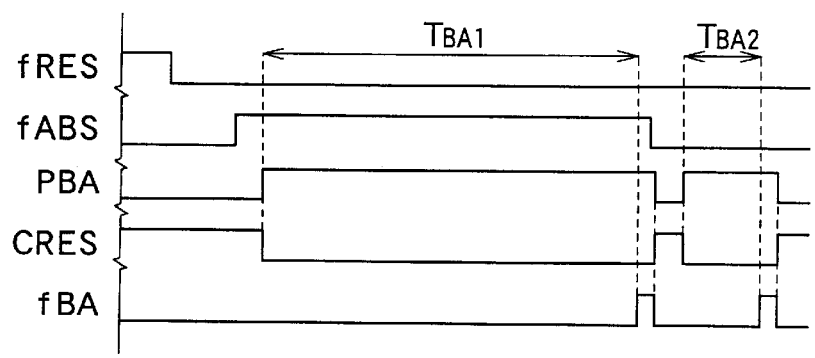

FIG. 9A illustrates a logic circuit used to monitor whether the calculation for the brake assisting function is conducted normally or not. FIGS. 9B and 9C illustrate timing diagrams during the operation of this logic circuit.

The signals Q4, Q14 illustrated in this figure are similar to that of FIG. 5A. Moreover, an AND circuits 801, 802, OR circuit 803, counter 804, AND circuit 805 for processing the signals Q4, fABS, Q14 operate in the same manner as the AND circuits 401, 402, OR circuit 403, counter 404 and AND circuit 405 of FIG. 5A.

(1) When the brake assisting control is not executed, a signal PBA notifying the brake assisting control condition, that is, a solenoid drive signal of the control valves driven during the brake assisting operation becomes low level. Thereby, an output of the OR circuit 806 becomes high level. Therefore, an output signal CRES of the OR circuit 806 becomes high level during the period up to the end of counting operation of the counter 804 and thereby the counter 804 is reset.

On the other hand, when the brake assisting control is executed, an instantaneous braking is conducted under the ABS control condition and thereby the counter 804 starts the counting operation in the timing of rise of pulse of the signal Q14. Since the brake assisting control is executed, the signal PBA becomes high level but the signal fBA becomes low level and the counter 804 is reset because the vehicle usually stops if the brake assisting control is conducted for a certain period of time.

(2) For example, if the brake assisting control is not cancelled even when the vehicle stops, for example, with the brake assisting control and ABS control, the ABS control is still continued and therefore the counter 804 performs the counting operation in the timing of rise of pulse of the signal Q14. Moreover, since the brake assisting control is executed, the signal PBA becomes high level. Since the brake assisting control is not yet cancelled, the signal PBA is maintained in the high level and the counter 804 is not reset. Therefore continues the counting operation up to the final digit.

In addition, when the brake assisting control is continued not even in the ABS control condition, since the ABS control is not effective, the counter 804 executes the counting operation in the timing of the rise of pulse of the signal Q4. That is, the counting operation is executed at the higher speed than that in the ABS control condition. Therefore, when the signal PBA notifying the brake assisting control condition becomes high level, the counter 804 counts up to the final digit before the signal PBA becomes low level.

Referring to FIGS. 9B and 9C, when the signal PBA becomes low level normally during the period TBA1 under the ABS control condition as illustrated in FIG. 9B, the output signal CRES of the OR circuit 806 becomes high level and the counter 804 is reset. If the PBA does not become low level as illustrated in FIG. 9C, the counter 804 is not reset. Therefore, the signal fBA becomes high level.

Moreover, when the signal PBA becomes high level during the period TBA2 not in the ABS control condition, the counter 804 quickly executes the counting operation and thereby the signal fBA becomes high level. However, when the signal PBA becomes high level due to the noise in during the period TBA2 as illustrated in FIG. 9B, the signal fBA does not become high level because the signal PBA returns quickly to the low level.

Therefore, a fault of the arithmetic operation condition of the microcomputer 60 can be detected from the signal fBA outputted from the counter 804.

The present invention should not be limited to the disclosed embodiments and modifications, but may be implemented in various other ways.

What is claimed is:

1. A method of monitoring a microcomputer in an electronic control unit comprising a microcomputer and a peripheral IC, the method comprising the steps of:

transmitting data from the microcomputer to the peripheral IC; and monitoring a fault of the microcomputer by the peripheral IC based on the data received from the microcomputer;

inputting an external signal to an input circuit of the peripheral IC; and comparing, by the peripheral IC, the received data with a predetermined pattern determined based on the external signal, which is inputted to the input circuit, wherein:

the input circuit the input circuit includes a waveform shaping circuit, and the external signal which has a frequency, is inputted to the waveform shaping circuit; and the peripheral IC counts a number of outputs of the waveform shaping circuit and compares the counted number with the received data.

2. The method as in claim 1, further comprising the steps of:

transmitting data from the peripheral IC to the microcomputer; and monitoring faults of the microcomputer and the peripheral IC by the microcomputer based on the data received from the peripheral IC.

3. The method as in claim 1, further comprising the step of:

monitoring an interval of data communication from the microcomputer by the peripheral IC.

4. The method as in claim 1, wherein:

a plurality of data communications are performed to the peripheral IC from the microcomputer; and the monitoring step of the peripheral IC monitors a sequence of the plurality of data communications from the microcomputer.

5. The method as in claim 1, wherein:

an arithmetic operation result of the microcomputer is transmitted through data communication from the microcomputer and the received data is compared with a predetermined fault pattern by the peripheral IC.

6. A control unit comprising:

a microcomputer; and a peripheral IC, wherein:

the microcomputer is constructed to transmit data to the peripheral IC;

the peripheral IC is constructed to monitor a fault of the microcomputer based on the data received from the microcomputer;

the peripheral IC has an input circuit to which an external signal is applied;

the peripheral IC is constructed to compare the received data with a predetermined pattern determined based on the signal inputted to the input circuit;

the input circuit includes a waveform shaping circuit, and the external signal, which has a frequency, is inputted to the waveform shaping circuit; and the peripheral IC is constructed to count a number of outputs of the waveform shaping circuit and compares the counted number with the received data.

7. The control unit as in wherein:

the peripheral IC is constructed to transmit data to the microcomputer, and the microcomputer is constructed to monitor the fault of the microcomputer based on the data received from the peripheral IC.

8. The control unit as in claim 6, wherein:

the peripheral IC is constructed to monitor an interval of data communication from the microcomputer.

9. The control unit as in claim 6, wherein:

the microcomputer is constructed to communicate a plurality of data to the peripheral IC; and the peripheral IC is constructed to monitor a sequence of the plurality of data from the microcomputer.

10. The control unit as in claim 6, wherein:

the microcomputer is constructed to communicate an arithmetic operation result thereof to the peripheral IC; and the peripheral IC is constricted to compare the received data with a predetermined fault pattern.

11. The control unit as in claim 6, wherein: the peripheral IC is constructed to output a fault signal indicative of a fault of the microcomputer when a fault of the microcomputer continues for a predetermined period.

12. The control unit as in claim 6, wherein:

the control unit is applied as an electronic control unit for a brake control system;

the brake control system includes brake fluid pressure generating sources for generating a brake fluid pressure, wheel brake force generating means for receiving a brake fluid pressure from the brake fluid pressure generating source to generate a brake force respectively to each wheel, piping provided between the brake fluid pressure generating source and the wheel brake force generating means, and a plurality of control valves provided in the piping; and a plurality of control valves are respectively controlled based on an arithmetic operation result of the microcomputer for application to control of the brake fluid pressure applied to the wheel brake force generating means.

13. The control unit as in claim 12, wherein:

the microcomputer detects that any wheel is in a slip-like condition to realize an anti-lock brake control to restrict the wheel from the slip-like condition by driving the plurality of the control valves of the wheel and controlling increase or decrease of a brake fluid pressure applied to the wheel brake force generating means; and a signal notifying the fault of the microcomputer is outputted, when a signal to drive any valve of the plurality of the control valves is detected from the data received by the peripheral IC under a condition that no wheel is detected as in the slip-like condition.

14. The control unit as in claim 12, wherein:

a signal notifying a fault of the microcomputer is outputted when a signal for increasing the brake fluid pressure applied to the wheel brake force generating means is not outputted for a predetermined period from the data received by the peripheral IC under the anti-lock brake control condition or when, if such a signal is outputted, this signal is overlapped on the signal for decreasing the brake fluid pressure applied to the wheel brake force generating means.

15. The control unit as in claim 12, wherein:

a signal for notifying a fault of the microcomputer is outputted when it is detected from the data received by the peripheral IC under the anti-lock brake control condition that the signal for decreasing the brake fluid pressure applied to the wheel brake force generating means is outputted for a predetermined period.

16. The control unit as in claim 12, wherein:

a driver is provided to respectively drive the plurality of the control valves; and the peripheral IC outputs a signal to the driver to inhibit the drive of the plurality of the control valves when a fault of the microcomputer is detected.

17. The control unit as in claim 12, wherein:

first switching means is provided to respectively control the ON/OFF condition of a voltage supply to the plurality of the control valves; and the peripheral IC outputs a signal to the first switching means to turn off the voltage supply to the plurality of the control valves by the first switching means when the fault of the microcomputer is detected.

18. The control unit as in claim 6, wherein:

second switching means is provided to control ON/OFF condition of a voltage supply to a pump driving motor provided in the piping; and the peripheral IC outputs a signal to the second switching means to turn off the voltage supply to the motor by the second switching means when a fault of the microcomputer is detected.

19. A control unit comprising:

a microcomputer; and a peripheral IC, wherein:

the microcomputer is constructed to transmit data to the peripheral IC;

the peripheral IC is constructed to monitor a fault of the microcomputer based on the data received from the microcomputer;

the control unit is applied as an electronic control unit for a brake control system;

the brake control system includes brake fluid pressure generating sources for generating a brake fluid pressure, wheel brake force generating means for receiving a brake fluid pressure from the brake fluid pressure generating source to generate a brake force respectively to each wheel, piping provided between the brake fluid pressure generating source and the wheel brake force generating means, and a plurality of control valves provided in the piping;

a plurality of control valves are respectively controlled based on an arithmetic operation result of the microcomputer for application to control of the brake fluid pressure applied to the wheel brake force generating means;

the microcomputer detects that any wheel is in a slip-like condition to realize an anti-lock brake control to restrict the wheel from the slip-like condition by driving the plurality of the control valves of the wheel and controlling increase or decrease of a brake fluid pressure applied to the wheel brake force generating means; and a signal notifying the fault of the microcomputer is outputted, when a signal to drive any valve of the plurality of the control valves is detected from the data received by the peripheral IC under a condition that no wheel is detected as in the slip-like condition.

20. A control unit comprising:

a microcomputer; and a peripheral IC, wherein:

the microcomputer is constructed to transmit data to the peripheral IC;

the peripheral IC is constructed to monitor a fault of the microcomputer based on the data received from the microcomputer, the control unit is applied as an electronic control unit for a brake control system;

the brake control system includes brake fluid pressure generating sources for generating a brake fluid pressure, wheel brake force generating means for receiving a brake fluid pressure from the brake fluid pressure generating source to generate a brake force respectively to each wheel, piping provided between the brake fluid pressure generating source and the wheel brake force generating means, and a plurality of control valves provided in the piping;

a plurality of control valves are respectively controlled based on an arithmetic operation result of the microcomputer for application to control of the brake fluid pressure applied to the wheel brake force generating means; and a signal notifying a fault of the microcomputer is outputted when a signal for increasing the brake fluid pressure applied to the wheel brake force generating means is not outputted for a predetermined period from the data received by the peripheral IC under the anti-lock brake control condition or when, if such a signal is outputted, this signal is overlapped on the signal for decreasing the brake fluid pressure applied to the wheel brake force generating means.

21. A control unit comprising:

a microcomputer; and a peripheral IC, wherein:

the microcomputer is constructed to transmit data to the peripheral IC;

the peripheral IC is constructed to monitor a fault of the microcomputer based on the data received from the microcomputer;

the control unit is applied as an electronic control unit for a brake control system;

the brake control system includes brake fluid pressure generating sources for generating a brake fluid pressure, wheel brake force generating means for receiving a brake fluid pressure from the brake fluid pressure generating source to generate a brake forte respectively to each wheel, piping provided between the brake fluid pressure generating source and the wheel brake force generating means, and a plurality of control valves provided in the piping;

a plurality of control valves are respectively controlled based on an arithmetic operation result of the microcomputer for application to control of the brake fluid pressure applied to the wheel brake force generating means; and a signal for notifying a fault of the microcomputer is outputted when it is detected from the data received by the peripheral IC under the anti-lock brake control condition that the signal for decreasing the brake fluid pressure applied to the wheel brake force generating means is outputted for a predetermined period.

* * * * *